United States Patent [19]

Gavin

[11] 4,164,932
[45] Aug. 21, 1979

[54] SOLAR HEAT COLLECTOR CONSTRUCTION

[75] Inventor: Joseph G. Gavin, Huntington, N.Y.

[73] Assignee: Grumman Corporation, Bethpage, N.Y.

[21] Appl. No.: 869,718

[22] Filed: Jan. 16, 1978

Related U.S. Application Data

[62] Division of Ser. No. 750,580, Dec. 15, 1976, Pat. No. 4,086,913.

[51] Int. Cl.$^2$ .................................................. F24J 3/02
[52] U.S. Cl. .................................... 126/448; 165/171; 165/173
[58] Field of Search ............... 126/270, 271; 237/1 A; 165/171, 173; 29/157.3 C, 157.3 D; 52/761–763

[56] References Cited

U.S. PATENT DOCUMENTS

| | | | |
|---|---|---|---|
| 2,736,406 | 2/1956 | Johnson | 165/171 |
| 3,384,167 | 5/1968 | Javkin | 165/171 |
| 3,679,531 | 7/1972 | Wienand et al. | 165/171 |
| 3,972,317 | 8/1976 | Gallagher | 165/171 |
| 4,011,856 | 3/1977 | Gallagher | 126/271 |
| 4,064,866 | 12/1977 | Knight, Jr. | 165/171 |

*Primary Examiner*—Henry C. Yuen
*Attorney, Agent, or Firm*—Richard G. Geib; Mellor A. Gill

[57] ABSTRACT

A solar heat collector having an array of liquid transporting tubes and a plurality of heat absorber panels joined by a tube gripping accommodation on each panel providing structural integrity and good thermal conductivity.

1 Claim, 4 Drawing Figures

SOLAR HEAT COLLECTOR CONSTRUCTION

This is a division of application Ser. No. 750,580 filed Dec. 15, 1976 now U.S. Pat. No. 4,086,913.

FIELD OF INVENTION

The present invention relates to solar heat collectors and specifically to a novel and improved means for constructing solar heat collector absorber panels.

DESCRIPTION OF PRIOR ART

Many solar heat collectors employ tubes of copper or other metals to convey heat transport liquid (See Assignee's co-pending patent application Ser. No. 648,258 filed Jan. 12, 1976) now U.S. Pat. No. 4,059,093 which is heated by contact with the tube walls. The tubes in turn receive their heat from a flat plate, generally blackened, which is heated by the sun's rays. The connections between the plate and the tubes have been in many cases the cause of losses in performance, due to high thermal resistance associated with simple mechanical attachment. This problem has caused many designers to resort to soldering, brazing or welding the plates to the tubes in order to achieve a more perfect thermal union. But these forms of attachment are costly, especially when the plate and the tubes are of dissimilar metals, such as aluminum plates and copper tubes. Yet, aluminum is desirable as a plate material because of its low cost and high thermal conductivity, while copper is desirable as a tube material owing to its relative freedom from corrosion when used with untreated water.

SUMMARY

The present invention overcomes the objections previously raised against mechanical attachment of aluminum plates to copper tubes, and realizes all of the advantages of that union. It is a type of metal plate (hereinafter referred to as a finplank) such as can be produced by the extrusion process, so shaped that it will fit between any two tubes in an array of evenly-spaced parallel tubes and will lock with the adjacent finplanks to tightly grip the tubes and hence provide a good thermal connection.

It is, therefore, a primary object of the invention to provide finplanks which can be attached mechanically to an array of tubes by a locking means which grips the tubes tightly and thereby secures a good thermal connection.

Another object is to provide finplanks which can be attached quickly and easily to an array of tubes so as to provide a good thermal connection and which may be of a different metal than the tubes and which may use grease or other substance to further enhance the thermal connection.

BRIEF DESCRIPTION OF THE DRAWINGS

Other objects and advantages of the invention will become more apparent during the course of the following description when taken in connection with the accompanying drawings.

In the drawings, wherein like numerals are employed to designate like parts.

DESCRIPTION OF THE PREFERRED EMBODIMENT

Figure 1:
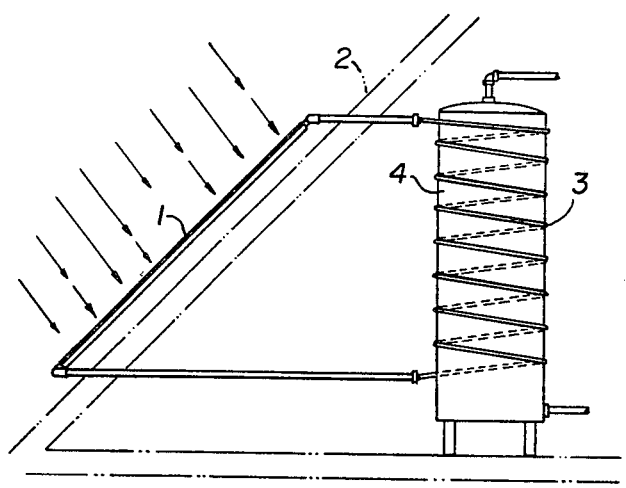
FIG. 1 is a schematic illustration of a use to which this invention may be put.

Referring to the drawings there is illustrated by FIG. 1 a solar collector assembly 1 according to this invention on roof 2 of a house for heating fluid in pipe heat exchanger 3 for a hot water tank 4.

Figure 2:
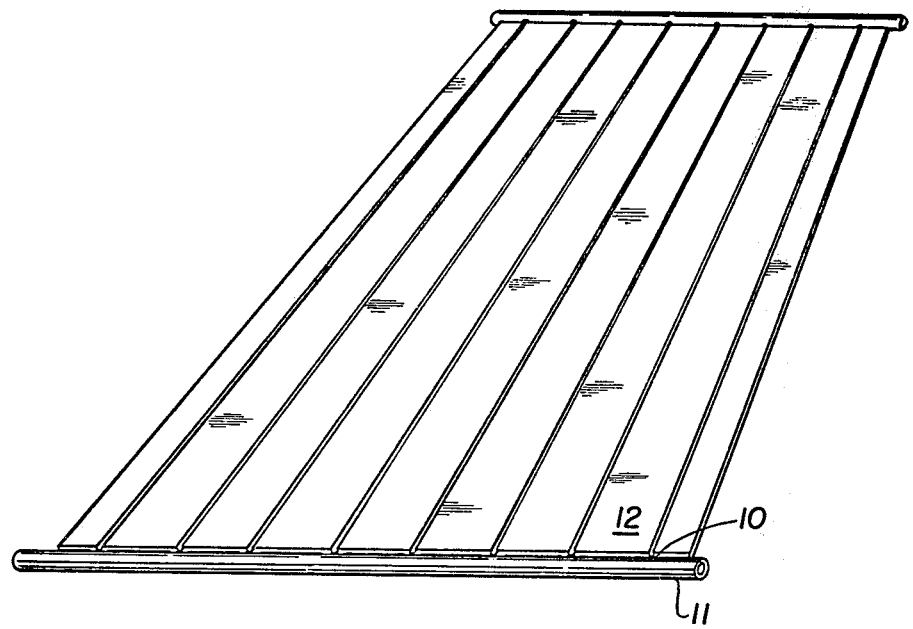
FIG. 2 is a three-quarter view of a solar heat collector absorber panel embodying the invention.
Figure 3:
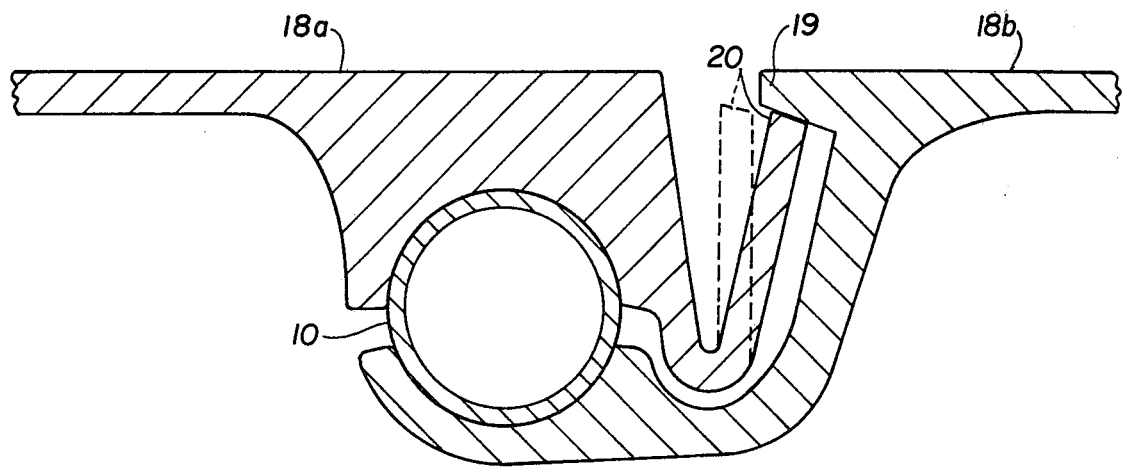
FIG. 3 is a cross-sectional view of a portion of the panel of FIG. 1.

The instant invention is more particularly illustrated in FIG. 2 where the solar heat collector absorber panel embodying the invention is there shown to include an array of evenly-spaced parallel tubes 10, joined to bottom header 11 to which are attached finplanks 12. In FIG. 3, a cross-sectional view of a portion of the solar collector panel is shown, consisting of finplanks 18a and 18b enclosing tube 10, and secured by flange 19 and lip 20. The lip 20 normally assumes a rest position prior to assembly as shown by the phantom line representation of both FIGS. 3 and 4.

Figure 4:
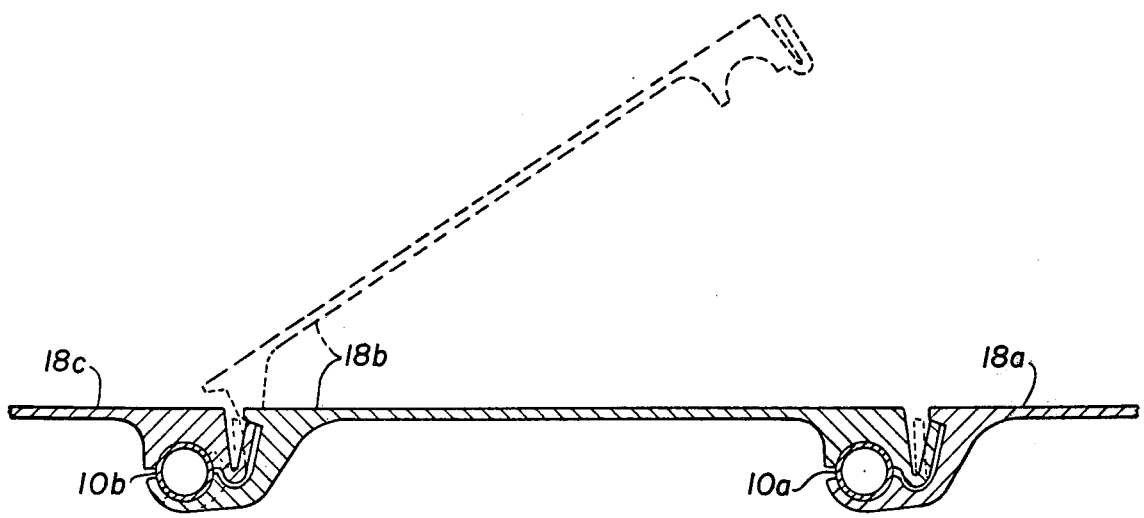
FIG. 4 is a view similar to FIG. 2 with the addition of an illustration showing method of attaching and locking a finplank to an adjacent one.

In assembling the solar collector panel, the parallel tubes are preassembled to headers. FIG. 4 illustrates how a finplank, 18b, is rotated into place around 18a prior to similar rotating assembly of 18c to enclose tubes 10a and 10b in assembly of attached finplanks 12. After rotation of the finplank 18b the lip 20 of finplank 18a is deformed to the solid line position of FIG. 3 so that its end bites on the undersurface of flange 19 to force the contoured edges of finplanks 18a and 18b to tightly encircle the tube 10. Similarly, as seen by FIG. 4 the next finplank 18c cooperates with 18b to engage tube 10a of the array of tubes 10. Thus one may appreciate the sequential assembly until the desired assembly of attached finplanks 12 is obtained.

Having described an operative embodiment of this invention it is now desired to set forth the protection sought by these Letters Patent in the appended claims.

I claim:

1. A solar collector comprising:
   an array of spaced tubes for conducting heat exchange fluid;
   means to collect solar energy and transfer its heat to said array of spaced tubes for heating said heat exchange fluid, said means comprising a plurality of finplanks with each finplank of said plurality having a cooperating vertical lip radiating from a downwardly facing first contoured surface at one edge and at another edge a lateral flange inwardly of an upwardly facing second contoured surface, said first contoured surface and said second contoured surface being dimensioned so as to cooperate when about separate portions of a tube of said array of tubes in enclosing said tube, said vertical lip being deformable downwardly and outwardly by said lateral flange on assembly of said another edge to said one edge in joining one finplank edge to another finplank edge to unite a plurality of finplanks said lip engaging said flange such that residual forces tending to return it to its vertical attitude will draw the contoured edges toward each other with the tube interposed in compression as an integral member in joining one finplank edge to another finplank edge to thereby force contact that will provide good thermal conductivity between said array of spaced tubes and said plurality of finplanks.

* * * * *